AVERAGE POWER ABSORBED BY THE CONDUCTOR AND DAMPERS BETWEEN FREQUENCIES 5 TO 50 Hz.

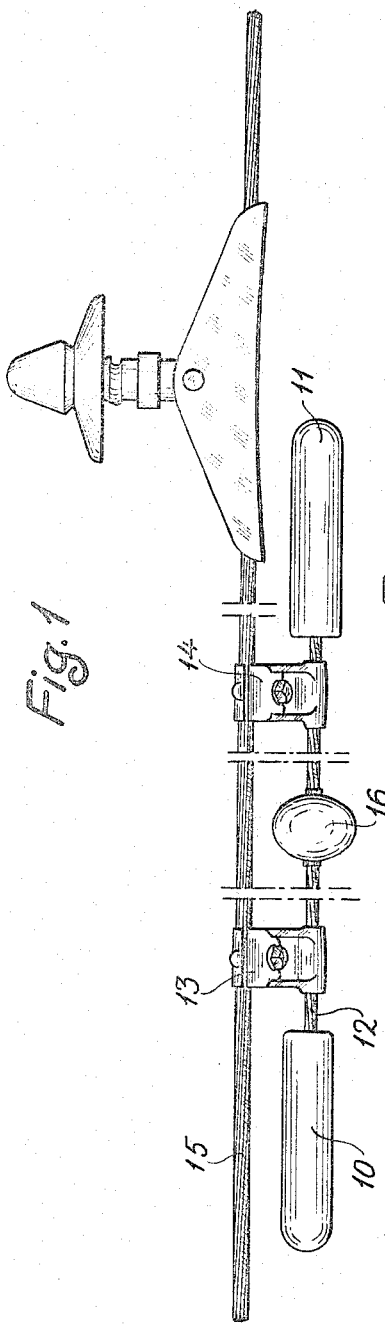
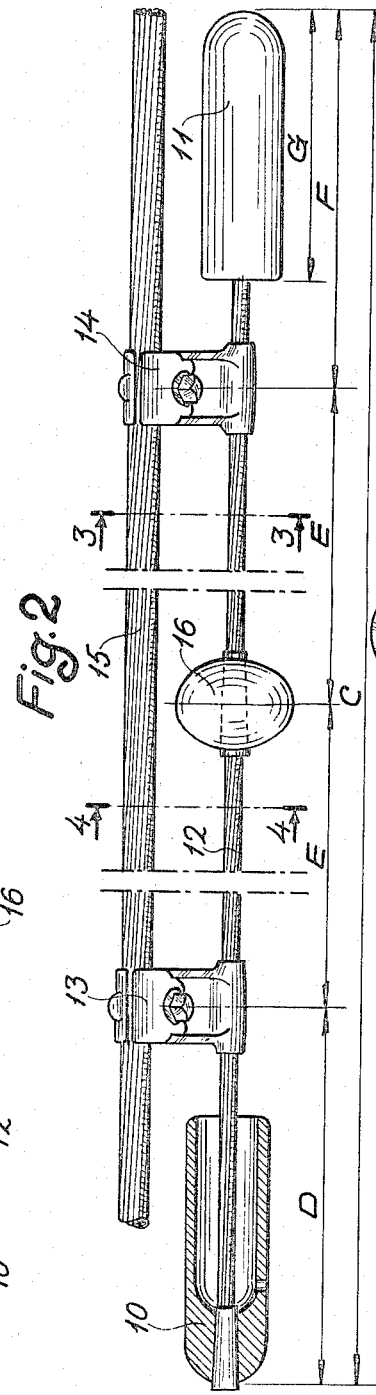
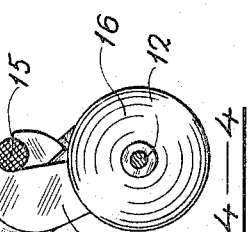
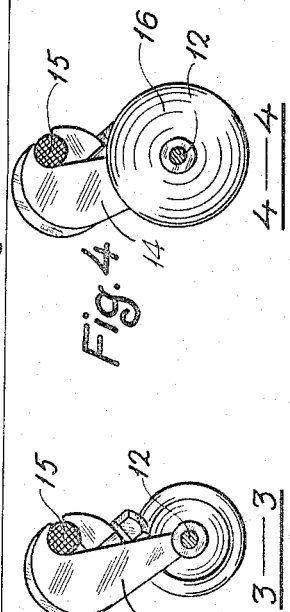

CONDUCTOR ACSR, IBIS, LENGTH 180 m
TENSION 6.0 kp/mm²
DISTANCE FROM SUSPENSION POINT 1.25 m
ANTINODE VELOCITY 0.10 m/s CORRESPONDING
TO A BENDING ANGLE OF 3.75'

INVENTOR
LAURI P. A. HARO
BY Nolte & Nolte
ATTORNEYS

United States Patent Office 3,327,048
Patented June 20, 1967

3,327,048
VIBRATION DAMPING APPARATUS
Lauri Petter Allan Haro, Huopalahdentie 15A17,
Helsinki 33, Finland
Filed Apr. 28, 1966, Ser. No. 546,060
4 Claims. (Cl. 174—42)

ABSTRACT OF THE DISCLOSURE

A vibration damper for overhead conductors having two weights connected by a resilient elongated member and two spaced clamps secured to the elongated member between the weights and dividing the elongated member into three parts having their resonant frequencies at the frequency range to be damped.

---

This invention relates to vibration dampers, particularly to vibration dampers used for protecting overhead transmission conductors and the like against aeolian vibrations often resulting in breakage of the conductor at its suspension or supporting points. Although vibration dampers are of greatest value when applied to electrical transmission conductors, it is to be understood that the invention is not limited to these applications but may be utilized in connection with all kinds of elongated members such as conductors, wires and the like subjected to mechanical vibrations.

The major part of the vibrations occurring on transmission conductors can be expected between frequencies of 5 to 50 Hz. (i.e. 5 to 50 cycles per second) corresponding to wind velocities of about 0.5 to 5 m./s. Mechanical vibration dampers used on a vibrating conductor are expected to absorb the maximum of the power induced by the wind into the conductor so as to decrease the vibration amplitudes and mechanical stresses of the conductor to values non-critical to the strength of the conductor.

Various types of vibration dampers have been developed during the last decades but even the most effective and widely used dampers are not capable of absorbing energy enough over the whole frequency range of from 5 to 50 Hz. One of the most well known vibration dampers is the conventional Stockbridge damper. This damper consists of two identical weights fixed at the ends of an elongated resilient member which by means of a centrally disposed clamp member is suspended from the conductor to be damped.

Tests performed by the applicant in a rock tunnel, where all external conditions affecting the test results could be controlled by the tester, have shown that the damping efficiency of Stockbridge dampers as function of frequency is rather uneven over the tested frequency range of 5 to 50 Hz.

The primary object of the present invention is to provide a vibration damper having better damping efficiency of great uniformity over the whole frequency range mentioned above than that obtainable with hereto known vibration dampers. Due to the better damping efficiency obtained, longer spans and/or higher mechanical tensions in conductors are possible.

Other objects and advantages of the present invention will be understood from the following description and the drawings attached thereto, in which:

FIG. 1 represents a diagrammatic view of a vibration damper fixed to a suspended conductor;

FIG. 2 is an elevational view partly in section of a vibration damper according to the invention;

FIG. 3 represents a sectional elevation on the plane 3—3 in FIG. 2;

FIG. 4 represents a sectional elevation on the plane 4—4 of FIG. 2; and,

Figure 5:
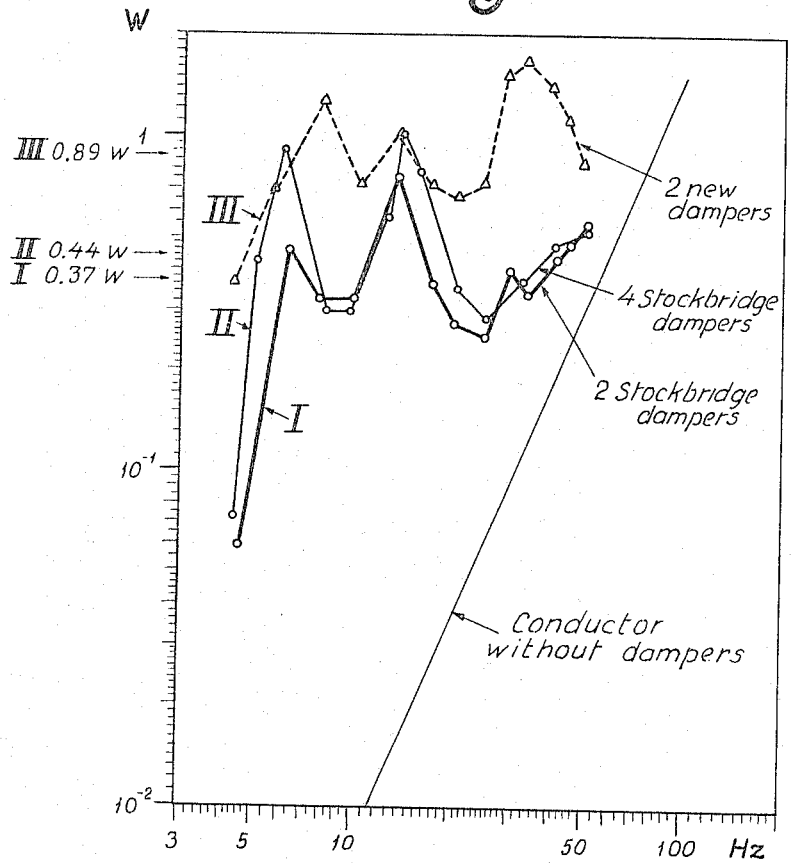
FIG. 5 is a graphical illustration of test results obtained and showing three different power absorption curves, one representing the results when two vibration dampers of the invention were used, and two curves representing the corresponding results for Stockbridge dampers when two and four dampers respectively were used.

A representative embodiment of the vibration damper according to the invention consists of two weights 10 and 11 of conventional Stockbridge form secured to the respective ends of a resilient member 12. This resilient member may consist of steel cable (hot dip galvanized) and to prevent corrosion it may be greased and sheathed in flexible tubing. Two clamping devices 13, 14 of conventional type are spaced apart from each other and secured to the resilient member 12 and fixed to the conductor 15 to be damped. The location of the clamping members on the resilient member is such that the free ends directed outwardly from the clamping members differ in length respectively. Thus, the two ends of the resilient member have different resonance frequencies selected to cover two different ranges of vibration frequencies of the vibrating conductor 15. The shorter free end with the weight 11 of the damper is directed towards the supporting point of the conductor, and this end is dimensioned so that its upper and lower resonance frequencies are about 30 to 40 percent higher than those of the other, i.e. the longer free end with its weight 10. As the high frequency end of the damper is directed towards the supporting point of the conductor it will be close to the antinode of the vibrations at high frequencies (i.e. vibrations with short wave lengths), which still improves the efficiency of the damper. Correspondingly, the low frequency end is suitably located when vibrations of low frequency, i.e., vibrations with long wave length, are to be damped.

The efficiency of the damper may still be improved by fixing an additional weight 16 suitable in form and weight to the resilient member 12 between the two clamp members 13 and 14. This additional weight 16 is selected so that its resonance frequency corresponds to a frequency range between the resonance frequency ranges of the two outer ends. The weight 16 is preferably fixed equidistant from the two clamping members 13 and 14 but the location thereof may be altered to suit altered requirements.

By way of example, suitable dimensions of the new damper will be given in the following table where the weight of the two identical masses 10, 11 is indicated as A, the weight of the additional mass 16 as B and the lengths of the different parts of the resilient member of steel cable as C to G as shown in FIG. 2.

| Conductor | Resilient member | A, kg. | B, kg. | C, mm. | D. mm. | E, mm. | F, mm. | G, mm. |
|---|---|---|---|---|---|---|---|---|
| 397,500 cir. mils ACSR (26/7) | 7 x φ 3.08 mm | 2.25 | 1.60 | 1,300 | 310 | 365 | 260 | 200 |
| 1,033,500 cir. mils ACSR (54/7) | 7 x φ 4.00 mm | 3.65 | 2.55 | 1,605 | 382 | 455 | 316 | 248 |

The power absorbing efficiency of a damper shown in FIG. 2 was tested and the values were compared with those obtained by testing various commercial damper types. The tests were performed under the same conditions by using dampers of the present invention as well as commercially known dampers. From the commercial damper types tested the Stockbridge damper showed the best damping efficiency. The test results obtained are drawn as curves on log-log-scales in FIG. 5 where the straight line represents an undamped conductor. From the diagram it will be readily seen that the curve III for the new damper shows a higher damping efficiency than even the Stockbridge damper irrespective of whether two or four Stockbridge dampers are used. The damping curve III is also more even than the curves I and II for Stockbridge, i.e., the new damper covers the whole frequency range from 5 to 50 c./s. more efficiently than the Stockbridge damper: the resonance peaks on lower and higher frequency ranges respectively are broader than those for Stockbridge dampers. The power absorption minima typical for Stockbridge dampers have been obviated by using an additional weight 16 between the clamping members.

For the curves I to III the average power absorbed is shown at the left hand side of FIG. 5.

The method used when performing the tests mentioned above is described in a report by the applicant ("Comparative Tests on Vibration Dampers by Lauri Haro") distributed to the members of Study Committee No. 6 of C.I.G.R.E., the tests having been performed by the applicant.

The new damper described and illustrated above is provided with two outer ends of different lengths but equal weights, thereby causing different resonance frequencies may, however, be obtained by using, for instance, free ends of equal length but carrying different weights, or by using resilient members of different thickness at the two outer ends of the damper, or by any combination of the said features. The three parts of the elongated member connecting the weights may be made either of one continuous resilient member as a piece of cable, or of two or three separate parts connected by the clamping members. The additional weight between the clamping members may be omitted but the damping effect will then decrease.

While specific embodiments of the present invention have been described, it is apparent other modifications will occur to those skilled in the art, and it is to be understood that the specific embodiments are not presented by way of limitation but that the present invention comprehends all constructions coming within the scope of the appended claims.

What I claim is:
1. A vibration damper consisting of two weights connected by a resilient elongated member, two spaced clamping members secured to the resilient elongated member located between the said weights and dividing said resilient elongated member into three resilient parts having their resonant frequencies at the frequency range to be damped, each of the clamping members being designed for attachment to an overhead conductor and the like to be damped.

2. A vibration damper as in claim 1, wherein the parts of the elongated member directed outwardly from the respective clamping members are of same length but differ in thickness.

3. A vibration damper as in claim 1, wherein the parts of the elongated member directed outwardly from the respective clamping members are of same length but the weights are different.

4. A vibration damper consisting of two identical weights connected by a resilient member, two spaced clamping members secured to the resilient member between and spaced from the said weights, the free ends of the resilient member directed outwardly from the clamping members being of different length, the clamping members being designed for attachment to a suspended conductor and the like to be damped, and an additional weight secured to the resilient member and intermediate and spaced from said clamping members.

References Cited

UNITED STATES PATENTS 2,688,047  8/1954  MacIntyre _____ 174—42
2,953,624  9/1960  Perrone et al. ____ 174—146 X

FOREIGN PATENTS 554,712  7/1932  Germany.
567,935  1/1933  Germany.

LARAMIE E. ASKIN, *Primary Examiner.*